May 20, 1930.      A. L. BIRDSALL      1,759,087
KNOB FOR FURNITURE
Filed July 18, 1929
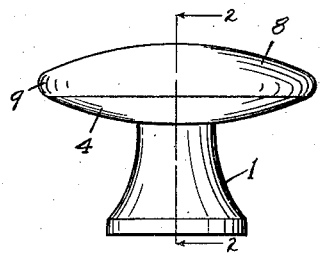
Fig-1-
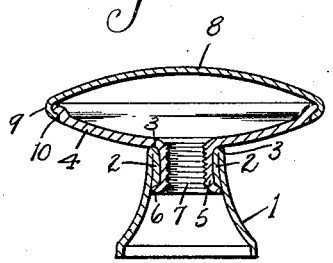
Fig-2-
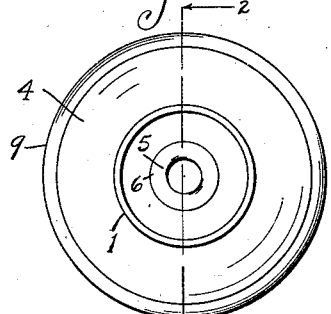
Fig-3-
INVENTOR
Albert L. Birdsall
BY Chappell & Earl
ATTORNEYS Patented May 20, 1930

1,759,087

UNITED STATES PATENT OFFICE

ALBERT L. BIRDSALL, OF GRAND RAPIDS, MICHIGAN, ASSIGNOR TO KEELER BRASS COMPANY, OF GRAND RAPIDS, MICHIGAN

KNOB FOR FURNITURE

Application filed July 18, 1929. Serial No. 379,169.

The main objects of this invention are to provide a sheet metal knob for furniture and the like which is attractive in appearance, strong and rigid and at the same time may be very economically formed of sheet metal stampings or parts.

Objects relating to details and economies of my invention will appear from the description to follow. The invention is defined and pointed out in the claim.

A structure which is a preferred embodiment of my invention is illustrated in the accompanying drawing, in which:

Fig. 1 is a side view of my improved knob.

Fig. 2 is a central section on line 2—2 of Figs. 1 and 3.

Fig. 3 is an inverted view.

My improved knob, in the embodiment illustrated, comprises an outwardly tapered shank 1 formed of sheet metal, the outer end of the shank being turned inwardly upon itself, the inturned portion 2 forming an internal shoulder, this inward turning of the end of the shank providing a round finished edge 3.

The back plate 4 of general concavo convex form is formed of sheet metal with a central tubular stud 5 disposed within the inturned portion 2 of the shank and secured therein by flanging or upsetting the end 6 of the stud upon the shoulder formed by the inturned portion 2. This stud is internally threaded at 7 to receive the attaching screw.

The face plate 8 also formed as a sheet metal stamping is of concavo convex form, its periphery 9 being flanged or turned over the edge of the back plate. The periphery of the back plate is outwardly offset providing a shoulder 10 against which the inturned edge of the face plate abuts, thereby forming a smooth joint.

With the parts thus arranged, I am able to produce the knobs very economically and of attractice design with no exposed rough edges.

Having thus described my invention, what I claim as new and desire to secure by Letters Patent, is:

In a knob for furniture and the like, the combination of a shank having its outer end turned inwardly upon itself providing an internal shoulder, and a head provided with a central stud fitting within said inturned portion of said shank and upset upon the inner edge thereof whereby the head and shank are secured together.

In witness whereof I have hereunto set my hand.

ALBERT L. BIRDSALL.